Aug. 13, 1935.                C. A. HENRIKSEN                 2,011,280
METHOD AND APPARATUS FOR APPLYING LOCKING DEVICES TO THREADED MEMBERS
Filed July 25, 1930            2 Sheets-Sheet 1

INVENTOR
CARL ADOLF HENRIKSEN
BY Edwin Levisohn
ATTORNEY

Aug. 13, 1935.  C. A. HENRIKSEN  2,011,280
METHOD AND APPARATUS FOR APPLYING LOCKING DEVICES TO THREADED MEMBERS
Filed July 25, 1930  2 Sheets-Sheet 2
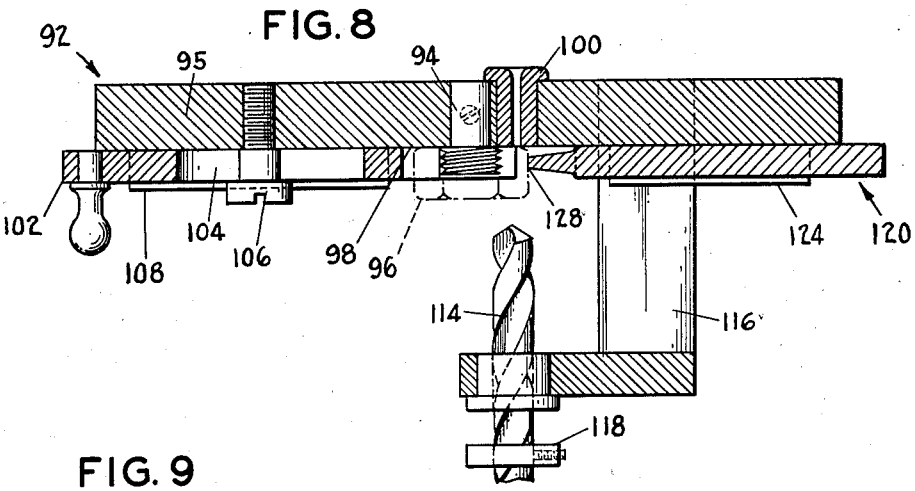
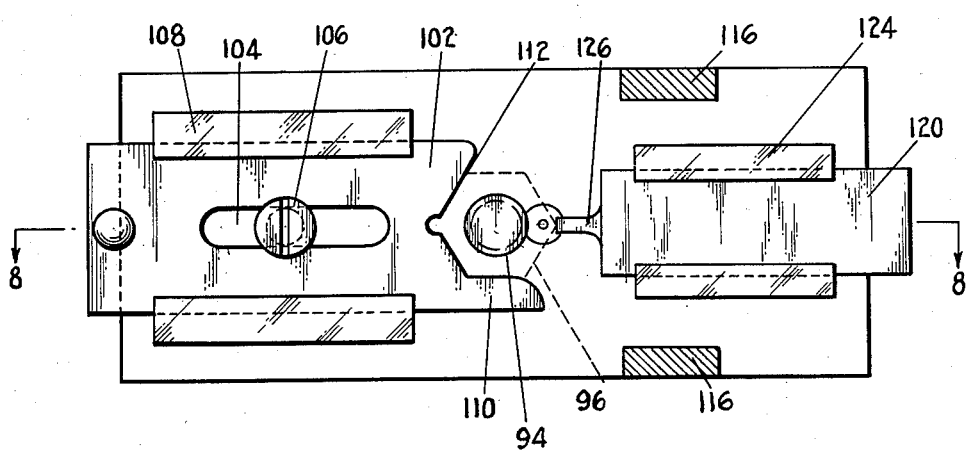
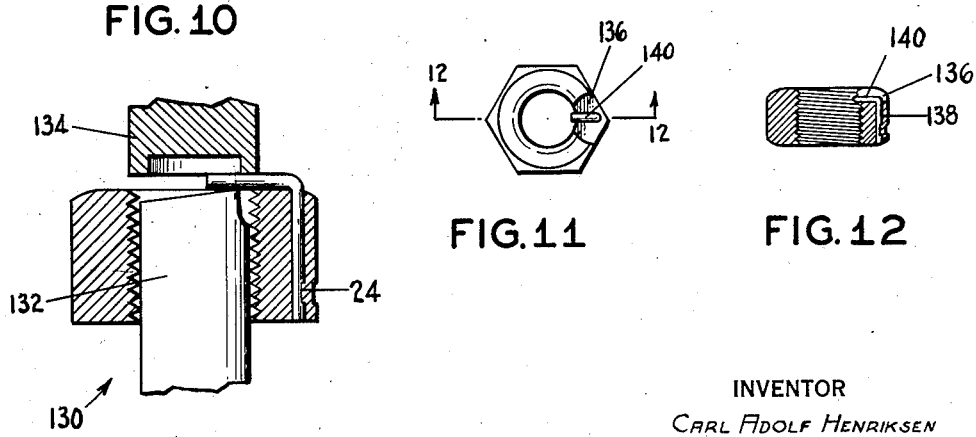
INVENTOR
CARL ADOLF HENRIKSEN
BY Edwin Levisohn
ATTORNEY Patented Aug. 13, 1935

2,011,280

UNITED STATES PATENT OFFICE 2,011,280

METHOD AND APPARATUS FOR APPLYING LOCKING DEVICES TO THREADED MEMBERS

Carl Adolf Henriksen, Ridgefield Park, N. J.

Application July 25, 1930, Serial No. 470,642

6 Claims. (Cl. 10—86)

This invention relates to locking devices for threaded members and to a method of and apparatus for the manufacture and assembly thereof.

Specifically, the invention herein described relates to screw-threaded members for assembly with complementary threaded members, such as bolts and nuts, one of which members carries an element for co-action with the threads of the other member to limit movement of the members relative to each other to one direction only. For this purpose, a pin is associated with one of the members in such manner as to be permitted limited pivotal movement; beyond the limits of such pivotal movement a free end of the pin may be strained, by a proper torque, an additional distance. This result is occasioned when the free end of the pin is engaged by the threads of the associated member, the reaction from the torsional strain producing a pressure application upon the threads of the associated member which would have a braking effect, restraining relative movement of the members.

The extending engaging end of the pin is of such length that it extends, in its normal position, beyond the line of the threads upon the member with which it is assembled. Therefore, when this member is engaged by its mated member and the members are relatively rotated, the end of the pin will first engage within the threads of the associated member and then be twisted slightly so that the pressure application hereinabove described will result. Naturally, the pin, in thus twisting, would have been moved in the direction of least resistance, that is, the flat side of the extending end would be in engagement with the walls of the thread. So long as rotation is continued in the direction commenced, the flat surface rides smoothly within the groove of the threads. However, when an attempt is made to reverse the relative movement of the threaded members, the end of the pin, which preferably is sharpened or bevelled for this purpose, will "bite" into the metal walls of the thread and restrain the members against such movement.

It has been found that the location of the pin with respect to the thread with which it is intended that it cooperate is a vital factor in the resultant efficiency of the locking operation. It is desirable that the pin engage its thread without bending other than that arising from the torsion above described; it is further desired that the extending end of the pin should substantially at all times be in abutment with a surface of the member with which it is assembled in order that a firmer backing therefor is secured.

The lock pin may be located so that the end, which is to co-act with the thread of a mated member, extends along a surface of the member with which it is assembled, or is seated within a recess in the same member. In either case, the pitch of the thread, the thickness of the pin and the point in the thread circle at which the thread cuts through some selected reference surface of the member, with which the pin is assembled, are important factors in determining the exact position to locate the lock pin.

It is an object of this invention to provide a screw-threaded member in which a locking device of the type hereinabove set forth is assembled and in which the lock pin has predeterminedly been located so that the locking operation will be effected with the greatest efficiency. The factors set forth above are considered in determining such position for the lock pin.

Particularly, the invention relates to the assembly of a locking pin with a nut of the regular polygonal type, in which, because of the amount of free metal presented at the corners of the nut, substantially the only practicable position for a pin of the type set forth is at one of the corners. As is well known, no special care is taken in the threading operation during the manufacture of such nuts, the point of commencement of the thread being entirely a matter of chance. It cannot, therefore, be predicted, before the threading operation, at which corner, or between which corners, the thread will commence.

It is an object of this invention to provide a method of and apparatus for determining the corner of nuts of the type above set forth with which lock pins of the type described should be assembled in order that the most efficient operation thereof may finally be had. In effecting the desired result, a stud bolt, of a size to mate with the nut upon which a lock pin is to be assembled, is formed with a reference surface against which such nut, when threaded down upon the bolt to the limit of movement, finally will abut. The relations of bolt and nut, when so assembled, is such that an indicator, either on the bolt or on some associated means, will denote or may be made to mark, upon the nut, the proper position at which the locking pin should be assembled. It is also possible, by an arrangement of this type, after the nut has been thus assembled with the reference bolt, to position the nut relatively to a drill, located in a predetermined position, so that an opening for the reception of the pin may be drilled while the nut remains in its set up position.

It is a further object of this invention to provide a device cooperating with the bolt above described and a nut therewith assembled, which will rotate the nut to bring the proper corner thereof, where regular polygonal nuts are operated upon, into relation either with the indicating means or the drill above set forth. The specific means herein disclosed consists of a member cut out to conform to a portion of the body of the nut and particularly a corner thereof, and, in a preferred construction, having an arm extending therefrom, which, when slid toward a nut mounted upon the bolt above described, will act to rotate the nut, and finally to lock it in position with the required corner positioned either over the indicating device or the drill.

In conjunction with such apparatus, in one embodiment of the invention, a die for marking the nut with some suitable data is positioned relative to the indicating means so that, simultaneously with the indication of the position for the lock pin, the data will be inscribed upon a face of the nut.

In another modification of the invention, in conjunction with the apparatus above set forth, a swaging device is provided and may be operated in such manner that, after a hole has been drilled for the lock pin, and the latter positioned therein, the device which has considerable weight, may be impelled against the nut to swage the metal about the opening in the nut in which is retained the locking pin, and thus to anchor the pin in position relative to the nut.

In the case of some of the sizes of nuts, it is, at times, impracticable, before the assembly of the lock pin with the nut, to predetermine the length of the extending end thereof which will most efficiently effect the desired results. It is an object of this invention to provide apparatus, and a method of operation, for assembling lock pins of indiscriminate lengths with the nuts in such cases, and for subsequently accurately trimming such pins to a desired length.

Other objects of the invention will be apparent from the description of specific embodiments of apparatus utilized for effecting the same, and from the drawings thereof, or will be specifically pointed out herein.

The invention is not intended to be restricted to the construction and arrangement of parts herein shown and described, nor to the specific methods of operation, nor to the various details thereof, as the same may be modified in various particulars without departing from the spirit and scope of the invention, some practical embodiments of which have been herein illustrated and described without attempting to show all the various forms and modifications in which the invention might be embodied.

On the drawings, in which are disclosed preferred embodiments of the invention, and of apparatus for effecting the same, Fig. 1 is a plan view of apparatus, embodying the invention, to locate accurately the proper corner of a nut or the like, at which locking means of the type set forth is intended to be assembled.

Fig. 8 is a horizontal sectional view, on the line 8—8 of Fig. 9 of a modified construction, embodying the invention, in which provision is made for drilling the opening for the pin while the nut is retained in position upon the bolt, for countersinking such opening, and for associating the pin fixedly in relation to the nut.

Fig. 9 is a front elevational view of the embodiment of the invention disclosed in Fig. 8.

Fig. 10 is a vertical sectional view, showing the apparatus, and the method of use thereof, for cutting lock pins to a predetermined length after they have been assembled with their respective nuts.

Fig. 11 is a plan view of a nut, with a locking device assembled therewith in a modified manner, and in accordance with the invention.

Fig. 12 is a vertical sectional view, on the line 12—12 of Fig. 11 illustrating the relation of the nut and the locking means therefor, the locking means being shown in elevation.

Figure 1:
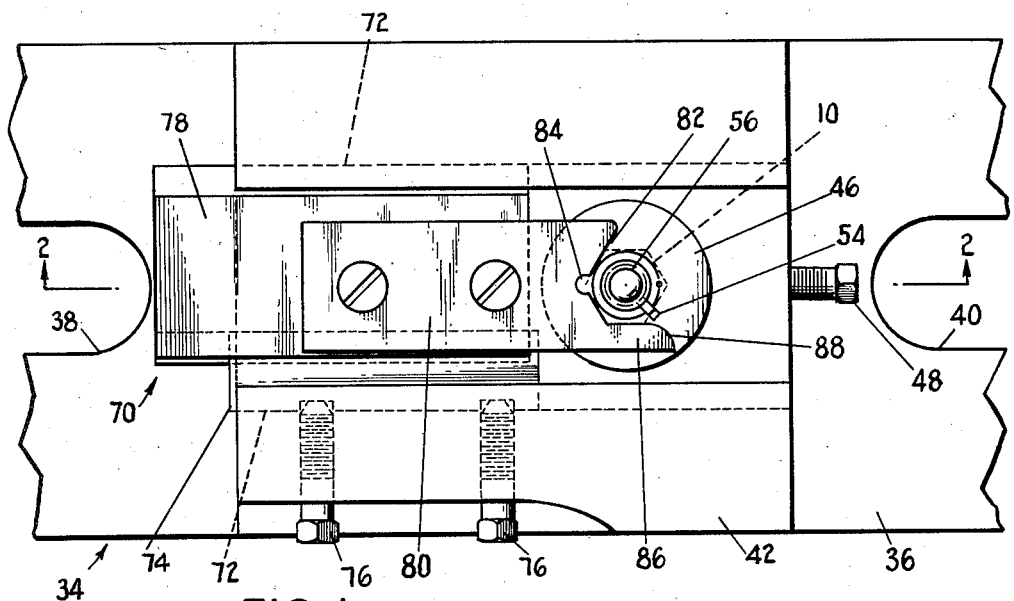
Figure 2:
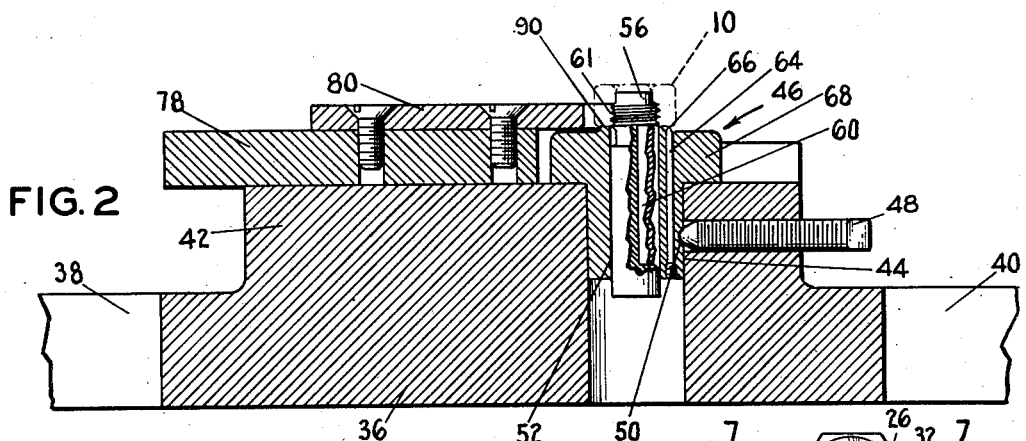
Fig. 2 is a longitudinal vertical sectional view on the line 2—2 of Fig. 1, portions thereof being shown in elevation.
Figure 4:
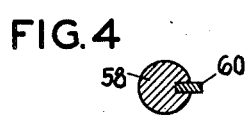
Fig. 4 is a transverse sectional view, on the line 4—4 of Fig. 3, of a detail of the apparatus shown in Figs. 1 and 2.
Figure 6:
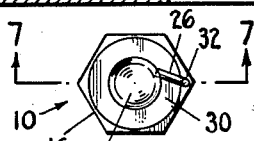
Fig. 6 is a plan view.
Figure 3:
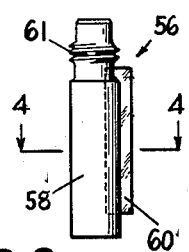
Fig. 3 is an elevational view.
Figure 5:
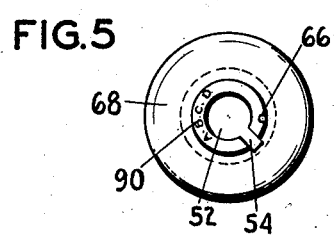
Fig. 5 is a plan view of a detail of the construction shown in Figs. 1 and 2.
Figure 7:
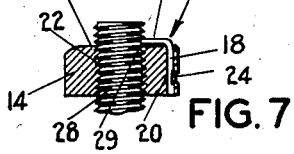
Fig. 7 is a vertical sectional view on the line 7—7 of Fig. 6, of a bolt having a nut, of the type operated upon by the apparatus of Figs. 1 and 2, assembled thereon.

In the particular embodiment of the invention shown Figs. 1 to 5, inclusive, special provision has been made for operating upon nuts 10 of the type shown in Figs. 6 and 7, wherein a lock pin 12 therefor and assembled therewith has that portion thereof which co-acts with the thread of a cooperating bolt, or the like, located in such manner as to lie substantially outside the body of the nut. Nuts of the type above referred to may be of any substantially general construction in which the body portions 14 thereof are regularly polygonal in transverse cross-section presenting a plurality of equiangularly spaced faces 16. The faces, so arranged, permit the use, in any adjusted position of the nut, of a wrench, or the like, thereupon for well known purposes.

The invention herein has particular relation to the provision of nuts of the type above set forth, with lock pins such as that shown at 12, assembled in such manner that, as a nut is threaded down over a bolt, the pin will engage within a thread of the bolt and if thereafter an attempt is made to reverse the direction of movement of the nut upon the bolt, the pin will, due to its construction and arrangement, restrain the nut against such movement until either some change be made in the position of the pin or the pin be broken.

Pin 12 is preferably formed as an L-shaped member, the long leg 18 of which is assembled within an opening 20 formed through the nut, the opening being preferably parallel to the threaded opening 22 of the nut. Leg 18 is formed with a recess 24 at a predetermined distance from the end thereof; when the leg is inserted into opening 20 with the nut lying upon some fixed surface, the end of the leg will be brought into abutment with such surface and the recess will thus be positioned in a predetermined relation to such surface of the nut; thereafter, a swaging element may be operated to dent the metal of the nut adjacent the opening 20 and in alignment with the positioned recess 24, thus squeezing the metal into the recess, to retain the pin assembled with the nut. The degree to which the metal is dented is controlled so that the pin is not rigidly clamped, but is permitted limited pivoting movement within the opening 20 beyond the limits set by the dented metal; further turning of the extending free end 26 of the pin will result in a torsional strain upon the leg 18. The extending free end will, in such event, exert a positive friction against any surface with which it is brought into contact. In such manner, if the free end be positioned to engage within the thread of a bolt or the like, it will react against the thread walls, resisting the turning of the bolt. Where the pin engages the walls of the thread, it should make an acute angle with a radius of the bolt extended through the point of contact. In such case, as the nut and bolt are moved into closer engagement, the pin end will slip over the thread faces. Now, if attempt be made to reverse the direction of movement of the bolt and nut, the pin will dig into the walls of the thread and positively restrain such reversed movement, thus locking the members against separation. This relation is shown in Figs. 6 and 7, in which the free end 26 is seen to have been engaged within the thread of bolt 28 in such manner that, should it be desired to turn the nut further upon the bolt, the pin will permit the same to be done, but should it be desired to remove the nut from the bolt, the pin will engage the thread to prevent any such movement. In order to assure the maximum reaction of the free end of the lock pin against such reverse turning, and particularly in cases where the threads are V-shaped, the end is bevelled, as appears at 29.

The position of the free end with respect to the thread it is to engage is of vital importance in securing the maximum efficiency for the locking arrangement. It is desirable that the lock pin, when moved pivotally to engage the thread of a bolt, should remain in the same plane as that in which it was originally assembled, that is, in abutment with the face 30 of the nut and over which it slides in its movement. By this construction, the reinforcement provided by the face 30 is afforded the free end of the pin in its resistance to deformation when attempt is made to reverse the direction of movement of the member.

To determine the position of the lock pin at which the results above set forth are attained, it is necessary to consider the pitch of the thread of the members, the thickness of the pin, and the angular position at which the thread commences in some surface of reference of the nut, such as one of the bottom and top faces. In those cases, where the nut as above described is formed with a plurality of faces 16, the desirable position for the pin is at one of the corners 32 since at this point the maximum metal for forming the necessary opening, and for the provision of a bearing surface for the free end of the pin, is found. In such construction it, therefore, is also necessary to determine the most desirable corner for the lock pin.

For these purposes, apparatus 34 is provided. In the specific embodiment shown on the drawings, the apparatus is seen to consist of a base 36 which may be secured to any suitable mounting by means of bolts or the like passed through slots 38 and 40 at the ends of the base. A raised body portion 42 of the base is formed with an opening 44 therethrough within which a headed bushing 46 may be seated and anchored in position by means of a set screw 48. The bushing and the top surface of the body portion may be provided with suitable markings to be brought into coincidence in the assembly of the bushing within the opening or a suitable indent 50 may be formed in the side of the bushing to cooperate with the pointed end of the set screw in fixing the position of said bushing relative to the body portion.

The bushing in turn is provided with a bore 52, in the wall of which, for a portion of the length thereof, a groove 54 is formed. A stud 56 having a body portion 58 of a diameter slightly less than that of the bore 52, also has a spline 60 fitted on the body portion; the stud may be slipped into the bore and the spline, into the groove, the relation of the rotational positions of the parts, when assembled, being thus predetermined. The lowermost extremity of the groove forms a stop to retain the stud and prevent its falling through the bore. The head of the stud is provided with a number of threads 61 which are of the same pitch as those of nut 10 intended to be assembled therewith, as hereinafter appears. It is to be understood that, in this apparatus, it is possible to operate upon nuts of different pitches merely by changing stud 56, that is by using a stud having threads 61 of the required pitch, and assembling the stud in the proper relation with the bore 52 of the bushing.

To indicate the proper point for drilling, or otherwise making the opening 20 through the body of the nut, the nut itself is screwed upon the threads 61 until the face of the nut, through which it is intended to insert the lock pin, is abutted against the upper face of the spline 60, the relation of the upper face of the spline and the correct position for the lock pin have previously been determined by experiment. The spline is, for this purpose, made longer than required, and then, by successively assembling blank nuts on the threads 61, the spline is filed off until the desired condition is found. It can readily be seen that, once this relation has been determined, the relation in all other nuts would be substantially constant.

To mark the proper position at which the necessary opening for the reception of the lock pin should be drilled in the nut, a punch 64 is secured in bushing 46 in any convenient manner, having a portion thereof screw-threadedly engaged within an opening through the bushing. A prick point 66 at the end of the punch extends out at the upper head 68 of the bushing, the angular position of the point being predetermined in relation to the position of the spline 60. The position of the prick point and the groove 54 remains fixed at all times so that the determination of the level of the upper face of the spline 60 is the only necessary operation to fix the position of the nut face before it is marked.

Where the nuts are formed, as above described, to have a polygonal transverse cross-section, as hereinbefore pointed out, it is necessary to determine not only the precise point at which the opening should be provided, but also the corner at which such opening should be made. In such case, as it can well be seen, the position of the lock pin must be determined with exactness as an error in the proper corner may increase the error which arises in some cases from positioning the lock pin away from the point actually required by the co-action of the nut surface with the upper face of the spline. That is, it will be found in some instances that the point determined by the positioning of the nut upon the stud will lie between two corners and will not be definitely at either one of them.

In apparatus 34, there is illustrated a selector 70 of such design as to cooperate with the several elements previously related in such manner that, when a nut, assembled with the stud in the manner hereinbefore appearing, has been positioned, by means of assembling the stud within the bore of the bushing, the selector may be made operative to indicate the proper corner for the imprint of the prick point, and will also be active to eliminate, to a substantial degree, such factors as play between the threads of the nut and the stud, in determining the exact point, with reference to the center of the threads, for the location of the lock pin.

For this purpose, there is cut out of the raised body portion 42 a machine way 72 within which is slidable the selector 70. A suitable filler or shim 74 is provided, in connection with which set screws 76 coact to regulate the friction upon the sides of the selector as it moves within machine way 72. The selector consists of a metallic block 78, formed to coact with machine way 72, and has secured to the upper surface thereof a plate 80. The end of the plate adjacent bushing 46 is cut out, as at 82, to conform to the shaping of the body of nuts intended to be assembled with stud 56. That is, if the nut to be assembled on the stud 56 is of hexagonal contour, the cut out portion will have a pair of sides diverging from each other at an angle of 120° or slightly greater, so that a corner of the nut may be seated therein. The apex 84 of the cut out is predeterminedly positioned with relation to the prick point of the punch so that, when a corner of a nut is in coaction with apex 84, another corner of the nut will be immediately over the prick point.

When the nut has been assembled on the threads 61 of stud 56 and the spline assembled in the groove of the bore, the nut face to be marked will be positioned relative to the prick point. Stud 56 is freely movable in the bore of the bushing so that, if pressure be applied to the nut, a mark would be made on the nut face adjacent the prick point to indicate the position at which the opening for the lock pin should be made. In those cases where, in the manufacture of the nuts, the beginning point of the threads was not controlled so that a corner would not now be positioned directly over the prick point, the nut must be turned slightly reversely of the original movement in assembling the same with the stud until, on moving the selector toward and into contact with the nut body, the apex of the cut out portion will firmly engage a corner of the nut so as to position a corresponding corner at the prick point. In addition thereto, the pressure applied by the selector against the side of the nut will be sufficient to move the thread faces within the nut sharply against one side of the stud 56. On marking the nut face for the point at which the opening for the lock pin is to be made, the indication will, in all cases, bear a distinct relation to one side of the threads, from which, in each case, the mark will be spaced a constant distance due to this positioning of the threads.

In order to facilitate the selection of the proper corner of the nut at which the marking should be made, an arm 86 is formed integrally with plate 80. The arm extends from plate 80 at the extreme edge of the cut out portion 82 and in such manner as to engage the face of a nut assembled on stud 56 and to turn it reversely of its normal direction of rotation, when being assembled on the stud, and when it happens that such a nut is positioned with a portion other than a corner thereof in direct association with the apex of the cut out portion. For the purpose of making the operation of rotating the nut smoother, the end of arm is provided with a cam surface 88, which, when the selector is slid toward the nut, will contact with a surface of the nut which is turned out of the properly set-up position. Further movement of the arm will result in turning the nut until a corner of the nut is engaged by the apex of the cut out portion and thus the nut is finally anchored in proper relation to the prick point.

After the nut has thus been located relatively to the prick point, a hammer blow may be delivered against the upper face of the nut to drive the face of the nut adjacent the prick point thereagainst and make a suitable center marking for the drilling of the required opening. It is desired, simultaneously with such center punching, to mark the nut face with any suitable data, such as patent date, or trade-mark, or similar data. For this purpose the face of the bushing may have portions 90 thereof raised and cut into die forms for the required markings so that, when a hammer or like implement is applied to drive the nut against the prick point, simultaneously therewith the die faces of the portions 90 will cut the face of the nut to make the proper impression thereon.

In Figs. 8 and 9, there is illustrated apparatus which permits the drilling of the opening for the lock pin without the intermediate step of marking. In apparatus 92 therein shown, a stud bolt 94 is positioned in a base plate 95 in such manner that, when a face of a nut 96, turned down upon the stud bolt, is abutted against the face 98 of the plate, the face of the nut will then be located over the opening of a drill bushing 100 extending through plate 95. By guiding a drill through the bushing a hole may then be drilled through the nut as the point on the nut, positioned below the drill bushing, is the required location for the lock pin in relation to the threads of the nut and of the prospective bolt to be assembled therewith. A selector 102 may be mounted by means of a slot 104, and a limit pin 106 and suitable guides 108, so that the arm 110 thereof, when the selector is slid toward the nut retained upon the bolt, will reversely rotate the nut and bring the proper corner of the nut under the drill bushing. The cut out portion 112 of the selector cooperates, in the manner previously set forth, in determining the proper angle for the nut in the relation to the drill bushing. The stud bolt is preferably angularly adjustable relatively to the plate 95 in order that, by proper trial, the angular position of the nut relative to the drill bushing, when a face of the nut is in abutment with the face 98 of the plate, may properly be predetermined for the purposes hereinabove set forth, the stud being then fixed, by a suitable screw, in the adjusted position.

Apparatus 92 lends itself to another manner of operation in which quantity production is a desired result. The nut hereinbefore dealt with has had the lock pin located upon a surface of the nut which itself was brought into engagement with reference surface before marking or drilling for the lock pin was effected. The height of the nut was, therefore, not a factor in the operation. Furthermore, in these cases, the lock pin was located so that the extending effective end thereof rested upon an outer surface of the nut. This condition is, in many cases, undesirable.

To facilitate the assembly of the lock pin with a nut, and, at the same time, to provide a method of assembly whereby the lock pin will be hidden substantially within the body of the nut, or similar member carrying such locking pin, the apparatus shown in Figs. 8 and 9, may be utilized in conjunction with a suitable drill 114, mounted upon fixture 116. The fixture is supported externally of the face 98 of the plate 95 so that the drill 114 may be moved toward and away from the plate. A stop 118 may be provided to limit the movement of the drill, for a purpose hereinafter appearing. In the process hereinafter appearing, stud bolt 94 must be cut off so as to present but one or more complete threads with which the nut threads may coact in threading the nut upon the bolt and against face 98, a substantial portion of the nut being thus left free from interference from the stud bolt.

A nut is threaded down upon the stud bolt until a face thereof abuts face 98 of the plate 95 and the proper corner of the nut is then located by means of selector 102, in the manner above set forth. Drill 114 may now be moved against the free nut face and operated to drill a hole thereinto until the inward motion of the drill is halted by stop 118. The position of stop 118 relative to the drill will be predetermined in substantially the same manner as the stop surface provided by the upper edge of spline 60 was determined, that is, by trial. After the countersink has thus been formed, a drill may be inserted through drill bushing 100 and the opening for the lock pin made.

A counter-sink has now been formed in an exposed surface of the nut, the surface being a predetermined distance away from the reference surface of the plate 95. Lock pins manufactured and bent to predetermined lengths may easily and quickly be assembled in the opening formed through the nut at the counter-sink without removing the nut from the stud bolt. Since the lock pins are of predetermined length, when a pin is inserted into the opening thus provided, the end inserted into the opening will abut the surface with which the face of the nut is in abutment and thus the extending end of the lock pin would be positioned immediately upon the counter-sunk surface.

In order to complete the assembly of the lock pin with the nut without removing the nut from its asembled relation upon the stud bolt, a device 120 may be operated, when the lock pin has been positioned within its opening, to swage the metal of the nut at the corner at which the pin is located and thus to anchor the pin in relation to the nut body. The device, for this purpose, consists of a substantially heavy body portion, formed to cooperate with a pair of guides 124 upon the plate 95 with which the stud bolt and the other related portions of the apparatus are assembled. Extending from the body portion toward the stud bolt and its assembled nut, and substantially aligned with the drill bushing, the center of the stud bolt, and the apex of the selector, is an arm 126 which is at an elevation, relative to the face with which the face of the nut coacts, predetermined by the fixed position of the recess 24 in the lock pin relative to the end thereof. The end of arm 126 is formed with a sharp wedge 128 so that, if the heavy body portion be moved through guides 124 with sufficient impetus, the wedge 128, in striking the corner of the nut, will swage the metal thereof into recess 24 and thus secure the lock pin in position.

While lock pins are intended to be prepared previously to their assembly within the nut body so that they have a predetermined height relative to the nut body, the extending free end cannot, in all cases, be accurately determined to secure the most efficient coaction of the pin end with its related bolt thread. Especially in the smaller sizes of nuts, the pin is preferably first assembled with the nut, and then, by suitable method, the pin is cut to the requisite length.

For the latter purpose, a die piece 130, the external diameter of the body 132 thereof being slightly less than the diameter of the crest of the thread within the nut, is inserted through the threaded opening of the nut until it abuts against the extending end of the lock pin assembled therewith. Then a die member 134, formed to cooperate with die piece 130, is moved thereover so that the cutting edges of the two members coact and shear the extending end of the pin to a length which has first been determined in accordance with such factors as the size of the nut, the depth of the thread cut and the pitch of the thread.

A nut of the general characteristics of those handled and operated upon in the apparatus shown in Figs. 8 and 9 is shown in Figs. 11 and 12. In this case, a countersink 136 is seen to have been provided, from which leads away the opening 138 for the lock pin 140, the latter resting upon the surface of the counter-sink.

It is to be noted that, in those cases where the drilling and tapping of the nuts has resulted in a threaded opening which is substantially at an angle other than a right angle relative to the surface of the nut, which is to be taken as the reference surface in the above assemblies, it becomes necessary to machine off the surface of the nut in some manner so that it will be substantially perpendicular to the direction of the threaded opening.

As many changes could be made in the construction and process herein involved, and many widely different embodiments of the invention designed without departing from the scope of the invention, as defined in the accompanying claims, the matter set forth by the above description may be interpreted as illustrative of an operative embodiment of the invention and not in a limiting sense.

I claim:

1. A method of manufacture for screw-threaded members having means for locking the same against rotational movement in one direction, which includes the steps of: assembling one of said members with a complementary threaded device having a predetermined zero face, screwing said member upon said device until said zero face is in abutment with a face of said member, locating said device in a predetermined position relative to a zero point, and forming an opening through said member in accordance with the location of said member relative to said zero point.

2. A method of manufacture for screw-threaded members having means for locking the same against rotational movement in one direction, which includes the steps of: assembling one of said members with a complementary threaded device having a predetermined zero face, screwing said member upon said device until said zero face is in abutment with a face of said member, locking said device in a predetermined position relative to a zero point, and forming an opening through said member in accordance with the location of said member relative to said zero point.

3. A method of manufacture for screw-threaded nuts having means for locking the same against rotational movement in one direction, which includes the steps of: assembling one of said nuts with a complementary threaded device having a predetermined zero face, screwing said nut upon said device until said zero face is in abutment with a face of said nut, locking said device in a predetermined position relative to a zero point, reversely threading said nut upon said device until the corner of said nut immediately adjacent the zero point is brought into position relative thereto, and marking the face of said nut.

4. A method of manufacture for screw-threaded nuts having means for locking the same against rotational movement in one direction, which includes the steps of: assembling one of said nuts with a complementary threaded device having a predetermined zero face, screwing said nut upon said device until said zero face is in abutment with a face of said nut, locking said device in a predetermined position relative to a zero point, reversely threading said nut upon said device until the corner of said nut immediately adjacent the zero point is brought into position relative thereto, and forming an opening through said nut in accordance with the location of said nut relative to said zero point.

5. Apparatus for producing a nut carrying a locking device, and in which the length of the locking device is predetermined to engage a member upon which the nut is to be assembled and to restrain the nut and member against relative rotation, the apparatus including a die for insertion into the threaded bore of the nut and fitting substantially closely within that bore, the extending end of the device being brought to rest in abutment with the end of the die, and a second die for cooperation with the first die and the end resting thereon to determine the length of that end.

6. Apparatus for producing a nut carrying a locking device, and in which the length of the locking device is predetermined to engage a member upon which the nut is to be assembled and to restrain the nut and member against relative rotation, the apparatus including a die for insertion into the threaded bore of the nut, the die being designed to be brought substantially into a fixed relation to the threaded walls of the bore, the extending end of the device being brought to rest in abutment with the end of the die, and a second die for cooperation with the first die and the end resting thereon to determine the length of that end.

CARL ADOLF HENRIKSEN.